(12) United States Patent
Nakano

(10) Patent No.: US 6,198,883 B1
(45) Date of Patent: Mar. 6, 2001

(54) RANGE FINDING DEVICE FOR CAMERA

(75) Inventor: Toshifumi Nakano, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/363,216

(22) Filed: Jul. 29, 1999

(30) Foreign Application Priority Data

Aug. 3, 1998 (JP) ................................................. 10-218921

(51) Int. Cl.[7] .................................................. G03B 13/36
(52) U.S. Cl. ............................................................ 396/89
(58) Field of Search ............................. 396/89, 111, 114, 396/268, 272

(56) References Cited

U.S. PATENT DOCUMENTS

| | | | |
|---|---|---|---|
| 4,498,754 | * 2/1985 | Ohno et al. | 396/272 |
| 4,555,169 | * 11/1985 | Suda et al. | 396/111 |
| 4,777,506 | * 10/1988 | Hiramatsu et al. | 396/114 |
| 5,498,864 | * 3/1996 | Osawa | 396/114 X |

* cited by examiner

Primary Examiner—W. B. Perkey
(74) Attorney, Agent, or Firm—Frishauf, Holtz, Goodman, Langer & Chick, P.C.

(57) ABSTRACT

A range finding device for a camera comprises a range finding module including at least a range finding element, a first support member for supporting the range finding module, a second support member for rotatably supporting the first support member, a unit base for rotatably supporting the second support member, a first adjusting member, such as a screw, for rotatably adjusting the first support member provided in the second support member, and a second adjusting member, such as a screw, for rotatably adjusting the second support member. The first adjusting member is set relative to the unit base in a non-contacting fashion and the rotation adjustment by the first adjusting member is independent of, and exerts no influence over, the adjustment by the second adjustment member.

8 Claims, 4 Drawing Sheets

RANGE FINDING DEVICE FOR CAMERA

BACKGROUND OF THE INVENTION

The present invention relates to a camera and, in particular, to a range finding device mounted on a camera for autofocus control.

An autofocus camera is equipped with a range finding device for measuring a distance up to an object. In general, the range finding device has a range finding unit (module) and a mechanism for supporting it.

The range finding modules vary in the direction of the field of view, and the range finding modules are not always mounted on camera bodies with high accuracy.

For this reason, normally, a support mechanism of the range finding module has the function of adjusting the optical axis of the range finding module in right/left and up/down directions and, after the range finding device is mounted on the camera body, the direction of the optical axis of the range finding module is adjusted.

Further, an autofocus camera has, in general, a finder unit separated from the camera body and a range finding unit with the range finding module incorporated therein and, these units are assembled on the camera body in a mutually adjacent state. And a positional displacement among the camera body, finder unit and range finding module is adjusted.

The heretofore known range finding module support mechanism swingably supports the range finding module in the right/left and up/down directions and optical axis adjustment is achieved by swinging the range finding module in the right/left and up/down directions with the use of two adjusting screws abutting against the range finding module.

In this structure, however, the two adjusting screws abut against the range finding module in different directions and give a posture change to the range finding module whereby the range finding module is adjusted in the right/left and up/down directions. As a result, the up/down direction adjustment exerts an influence over the right/left adjustment and vice versa.

When, for example, the right/left direction adjustment is effected after the up/down direction adjustment, the up/down direction adjusting screw is moved relative to the range finding module. Such a relative movement imparts a delicate variation to the up/down direction posture of the "once-adjusted" range finding module. The posture variation provides a cause for readjustment relative to the up/down direction. The same thing can also be true of the up/down direction adjustment.

This situation fails to achieve optical adjustment in a brief time period, thus providing a bar to an improved production.

BRIEF SUMMARY OF THE INVENTION

It is accordingly the object of the present invention to provide a range finding device which allows the optical adjustment of the range finding module in a brief period of time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3A is a diagrammatic, half longitudinal cross-section of a spool chamber showing a spool shaft and thin plate arranged in the spool chamber and a motor of a motor drive unit arranged relative to the spool shaft.

DETAILED DESCRIPTION OF THE INVENTION

Figure 1:
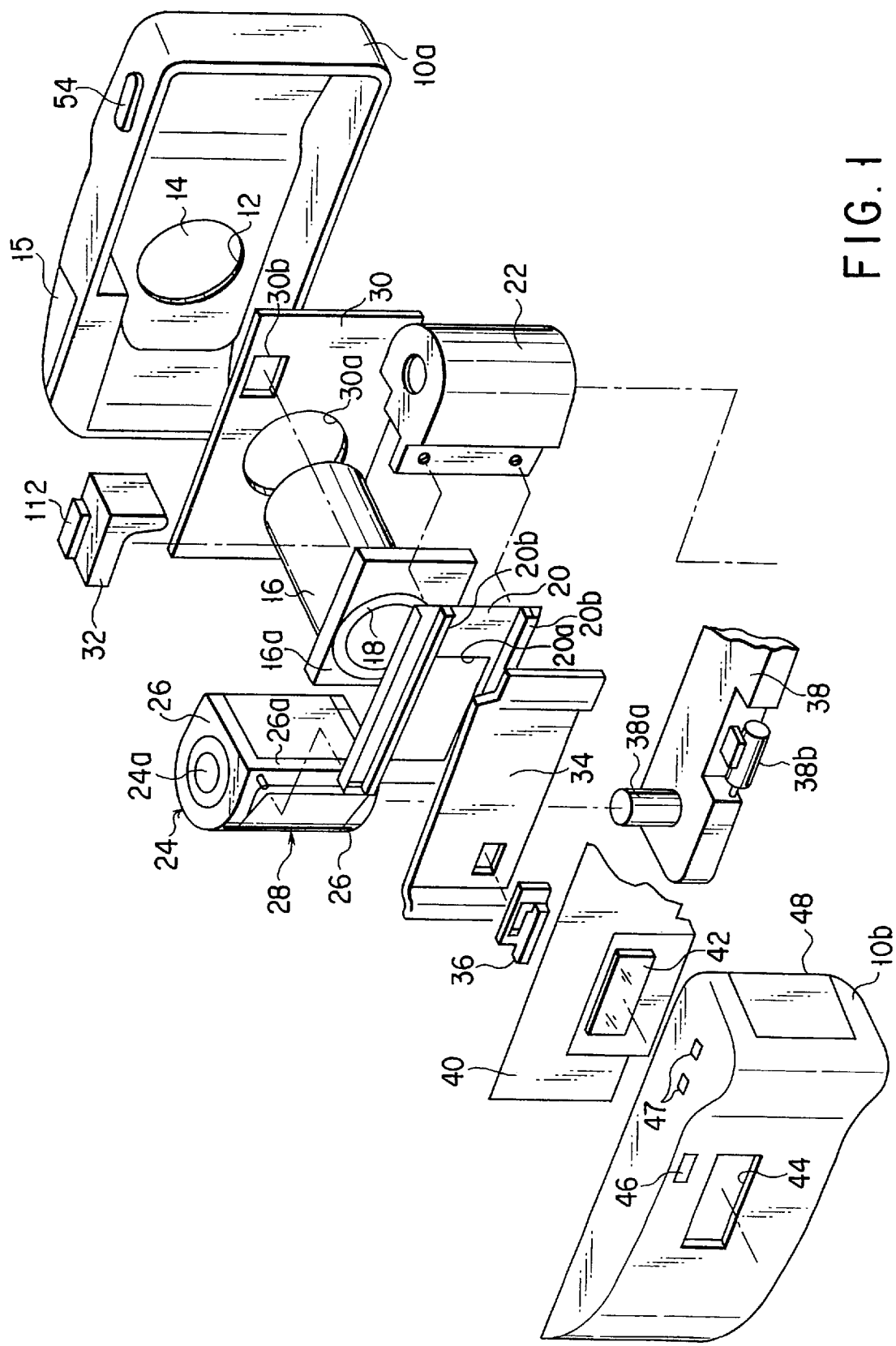
FIG. 1 is an exploded, perspective view diagrammatically showing a camera, looking down from a right-diagonally rear-upper direction, according to an embodiment of the present invention.

First, a general arrangement of a camera according to an embodiment of the present invention will be briefly explained below with reference to FIGS. 1 and 2.

An outer mount housing of a camera comprises a front cover unit 10a and a rear cover unit 10b. A lens barrel covering/exposing opening 12 is provided at a substantial center of a front surface of the front cover unit 10a. A barrier member 14 is provided at the front surface side and is movable between a closing position in which the lens barrel covering/exposing opening is covered and an exposing position in which the lens barrel covering/exposing opening is exposed.

A flashing unit 15 is provided at a left upper corner of the front side of the front cover unit 10a.

Within a storage space defined by the front cover unit 10a and back cover unit 10b, a lens barrel unit 16 is so arranged as to correspond to the lens barrel covering/exposing opening 12. The lens barrel unit 16 has a lens barrel support base plate 16a at a base end side, which is fixed to the front surface of a rail plate unit 20 through an elastic annular light shutting member 18.

The rail plate unit 20 comprises an image plane defining window 20a, which corresponds to the lens barrel unit 16. The rail plate unit 20 comprises a mask plate unit at the front, the mask unit serving as an image plane defining window frame within the image plane defining window 20a. In FIGS. 1 and 2, the mask plate unit, being thin, is omitted in illustration.

The rail plate unit 20 comprises a pair of film rails 20b, which are provided at a back surface of the rail plate unit 20 one at an upper side and one at a lower side and laterally extend parallel to each other.

The camera comprises a spool unit 24 constituting a spool chamber and a film cartridge unit 22 constituting a film cartridge chamber. The spool unit 24 and the film cartridge unit 22 are provide at the left and right end sides of the front plane of the rail plate unit 20, respectively.

The film cartridge unit 22 has a film cartridge access opening at a bottom surface, and the rear cover unit 10b comprises a film cartridge access cover, not shown, at a bottom. The film cartridge access cover, which is openable and closable, is provided at a position corresponding to the film cartridge access opening.

Figure 2:
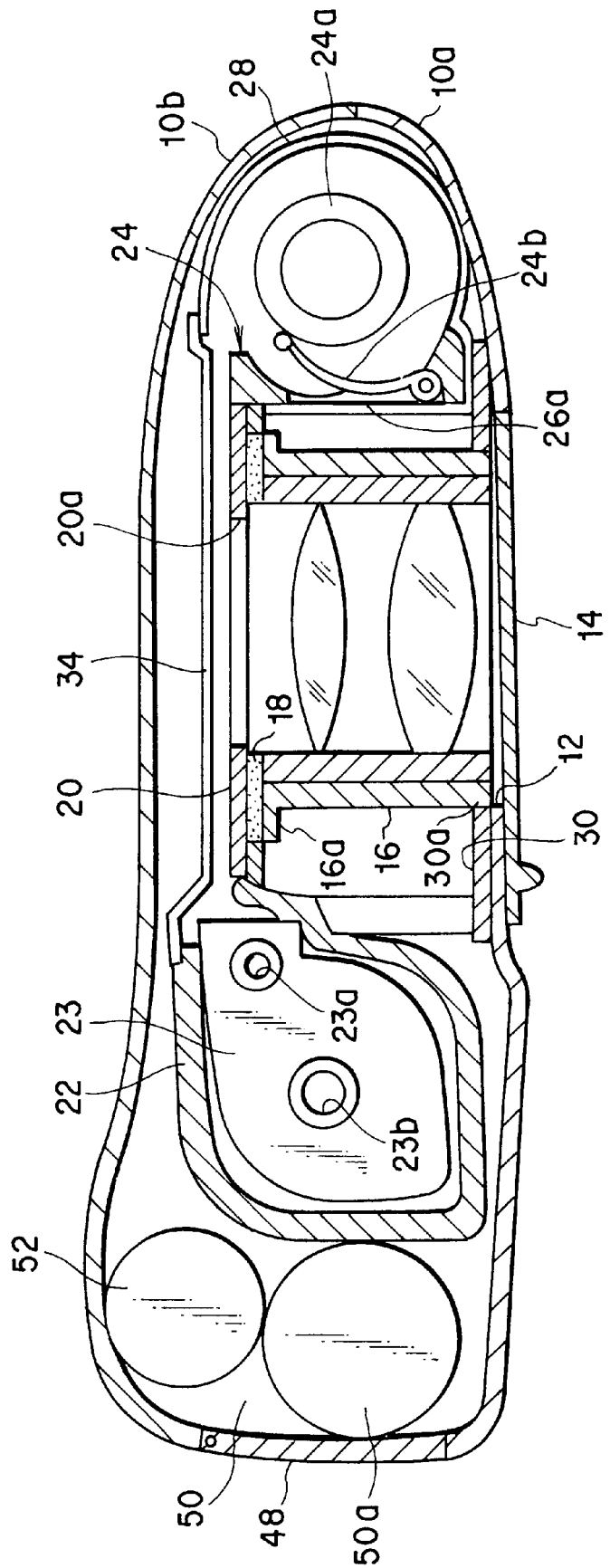
FIG. 2 is a horizontal cross-sectional view diagrammatically showing the camera according to the embodiment of the present invention.

In FIG. 2, a new film cartridge (IX240 cartridge) 23 is shown held in the film cartridge chamber of the film cartridge unit 22.

The spool unit 24 comprises a spool shaft 24a, which is rotatably held in the spool chamber. At a side wall of the spool chamber, a film pressing plate 24b, which is swingable in a radial direction of the spool shaft 24a, is provided adjacent the lens barrel unit 16. The film pressing plate 24b is urged by an urging means, not shown, toward an outer peripheral surface of the spool shaft 24a. The film pressing plate 24b is used for automatic film winding on the spool shaft 24a.

The spool chamber, which comprises a pair of end walls 26 at both width-direction sides (upper and lower sides in FIG. 1) of a film to be wound, is integrally connected to the lens barrel unit 16 through a portion 26a adjacent it. The side wall facing the film between the pair of end walls 26 is formed of an elastically deformable thin film 28 except the portion 26a adjacent the lens barrel unit 16, the thin film having an area greater than that of the portion 26a.

A detailed explanation will be given below about the structure of the spool chamber by referring to FIGS. 3 and 3A.

A reinforcing plate unit 30 is fixed to the front surfaces of the film cartridge unit 22 and spool unit 24 fixed to the right and left end portions of the rail plate unit 20. The reinforcing plate unit 30 has a lens barrel opening 30a positioned at an area corresponding to the lens barrel unit 16 and a finder opening 30b at a right upper corner. The finder opening 30b of the reinforcing plate unit 30 corresponds to a range finding window, not shown, provided in the right upper corner of the front wall of the front cover unit 10a. An autofocus and finder control unit 32 is fixed to the rear surface of the reinforcing plate unit 30.

The autofocus and finder control unit 32 includes a range finding device for autofocus. The structure of the range finding device will be explained later in more detail below with reference to FIG. 4.

A pressure plate unit 34 is fixed to the rear surfaces of the film cartridge unit 22 and spool unit 24 which are fixed to the right and left ends of the rail plate unit 20 as already set out above. The pressure plate unit 34 presses a new film, not shown, extruded from the new film cartridge 23 in the film cartridge unit 22 and leading to the spool chamber of the spool unit 24, against the paired rail members 20b of the rail plate unit 20, so as to define a film reference plane relative to the lens barrel unit 16.

Since the new cartridge 23 is used in this camera, a magnetic head 36 is provided at a left lower corner of the pressure plate unit 34 to record magnetic data on a magnetic recording track, not shown, along a lower edge portion of the new film.

The film cartridge unit 22 and spool unit 24 provided integral with the rail plate unit 20 and reinforcing plate unit 30 as set out above are coupled on a motor drive unit 38. The motor drive unit 38 comprises a motor 38a inserted into a center hole in a spool shaft 24a of a spool unit 24, a rotation transmitting means including, for example, a gear train for selectively transmitting a rotation force from the motor 38a to a plurality of predetermined sites, and a plunger/solenoid assembly 38b for allowing those destination sites of the rotation force by the rotation force transmitting means to be switched at a plurality of places.

The above-mentioned rotation force transmitting means is coupled to the spool shaft 24a of the spool unit 24, and to a rotation center shaft 23a and film cartridge shaft 23b for a film outlet opening/closing door of a new film cartridge 23 in the film cartridge unit 22. The force transmitting means selectively effects the opening/closing of the film outlet opening/closing door, extruding of a new film from the new film cartridge 23, taking-up of a new film onto the new film cartridge 23 and winding-up of the new film from the new film cartridge 23.

A flexible board unit 40 with an electric control circuit is arranged within a storage space covered with the front cover unit 10a and rear cover unit 10b of the outer mount housing, extending from the back of the pressure plate unit 34 to the upper side of the lens barrel unit 16, film cartridge unit 22 and spool unit 24 respectively fixed to the center and right and left ends at the front surface of the rail plate unit 20 as set out above.

The flexible board unit 40 includes a liquid crystal display device 42 at a back portion of the pressure plate unit 34. The liquid display device 42 is arranged in a liquid crystal display window 44 in the back wall of the rear cover unit 10b.

A finder eyepiece window 46 is formed in the back wall of the rear cover unit 10b. A finder unit, not shown, is arranged between the finder eyepiece window 46 and a finder objective window, not shown, formed adjacent the above-mentioned range finding window, not shown, in the right upper corner at the front wall of the cover unit 10a.

Various kinds of mode switching buttons 47 are arranged at the top wall of the rear cover unit 10b, which correspond to various mode changeover switches, not shown, on an upwardly arranged portion of the flexible board unit 40.

The rear cover unit 10b has a battery chamber opening/closing cover 48 on its right wall. The battery chamber opening/closing cover 48 allows access to and from a battery 50a in the battery chamber 50 defined in an interior space of the rear cover unit 10b at an area between the film cartridge unit 22 and the battery chamber opening/closing cover 48.

A condenser 52 for the flashing unit 15 mounted on the front cover unit 10a is arranged at the back side of the battery chamber 50 in the inner space of the rear cover unit 10b.

A shutter button 54 is arranged on the top wall of the front cover unit 10a, corresponding to a shutter switch, not shown, at the upwardly arranged portion of the flexible board unit 40.

As set out in more detail above, the camera is assembled by a combination of a plurality of mutually independently preformed units including the front cover unit 10a, rear cover unit 10b, flashing unit 15, lens barrel unit 16, rail plate unit 20, film cartridge unit 22, spool unit 24, reinforcing plate unit 30, autofocus and finder control unit 32, pressure plate unit 34, motor drive unit 38, flexible board unit 40, and mask plate unit.

The units described above include those that can be used to assemble another type of camera. What is only required to assemble this second type of camera is to prepare units to be used in the second type only. Since, in this manner, the above units include those that can be used for the assembly of cameras of different types, it is possible to provide various types of cameras on the market quickly and inexpensively.

The structure of the spool chamber will now be explained in more detail below with reference to FIGS. 3 and 3A.

Figure 3:
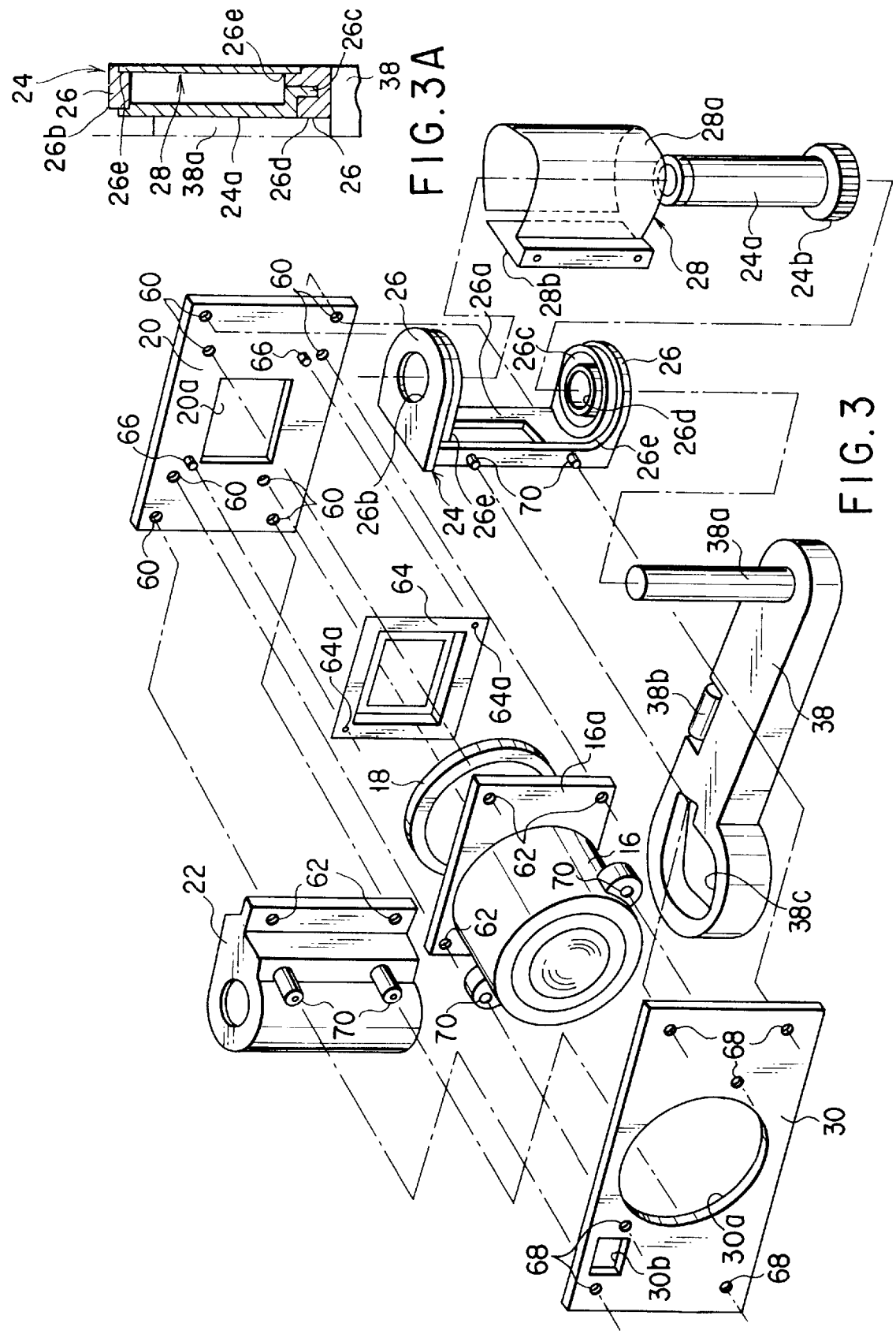
FIG. 3 is an exploded, perspective view diagrammatically showing a major part of the camera, looking down from a left-diagonally front-upper direction, according to the embodiment of the present invention.

In FIG. 3, the manner in which the lens barrel unit 16, film cartridge unit 22 and spool unit 24 are mounted on the rail plate unit 20 is indicated by dash-dot lines. A plurality of screws, not shown, are inserted into a predetermined number of through holes 60 provided at a predetermined number of places in the rail plate unit 20 and threadedly engaged into a predetermined number of through holes 62 provided at a plurality of places in the lens barrel support board 16a of the lens barrel unit 16, film cartridge unit 22 and spool unit 24, such that their assembly is achieved. In this case, the lens barrel unit 16, film cartridge unit 22 and spool unit are positioned relative to the rail plate unit 20 by a combination between one of each positioning hole, not shown, and each positioning projection formed at a predetermined number of positions at the rail plate unit 20 and the other of each positioning projection, not shown, and each positioning hole, not shown, provided at a plurality of places at the lens barrel unit 16, film cartridge unit 22 and spool unit 24.

In FIG. 3, a mask plate unit 64 is also shown which provides an image plane defining window frame arranged in the image plane defining window 20a of the rail plate unit 20. The mask plate unit 64 is positioned in the image plane defining window 20a by fitting positioning pins 66 provided at a predetermined number of positions on the forward surface of the rail plate unit 20 into corresponding positioning holes 64a provided at a predetermined number of places in the mask plate unit 64. The mask plate unit 64 is held by the lens barrel support board 16a and the lens barrel unit 16, by attaching the lens barrel support board 16a at a base end of the lens barrel unit 16 to the rail plate unit 20 through the annular light shutting member 18.

In FIG. 3, the manner in which the lens barrel unit 16, film cartridge unit 22 and spool unit 24 are mounted on the reinforcing plate unit 30 is indicated by dash dot lines. A plurality of screws, not shown, are inserted into a predetermined number of through holes 68 provided at a predetermined number of places in the reinforcing plate unit 30 and threadedly engaged into a predetermined number of through holes 70 provided at a predetermined number of places in the lens barrel unit 16, film cartridge unit 22 and spool unit 24. As a result, the above-mentioned mounting is achieved.

In FIG. 3, in the motor drive unit 38 on which the lens barrel unit 16, film cartridge unit 22 and spool unit 24 fixed to the rail plate unit 20 and the reinforcing plate unit 30 are mounted, a film cartridge access through hole 38c is shown which is interposed between a film cartridge access opening at the lower surface of the film cartridge unit 22 and the above-mentioned film cartridge access cover, not shown, at the lower surface of the rear cover unit 10b, not shown in FIG. 3. The film cartridge access through hole 38c constitutes part of the film cartridge chamber.

In FIGS. 3 and 3A, the manner in which the spool shaft 24a is rotatably retained between a pair of end walls 26 of the spool unit 24 and manner in which the motor 38a of the motor drive unit 38 is inserted into a center hole of the spool shaft 24a are shown. In the upper end wall 26 the upper end portion of the spool shaft 24a is inserted and a rotation center hole 26b is provided in which the upper end portion of the spool shaft 24a is rotatably held. In the lower end wall 26 the lower end portion of the spool shaft 24a is inserted and an annular rotation center groove 26c is provided in which the lower end portion of the spool shaft 24a is rotatably supported. A center hole 26d is provided in the lower end wall 26 at a center of the annular rotation center groove to allow the motor 38a of the motor drive unit 38 to be introduced into the center hole of the spool shaft 24a.

A gear 24b is formed on the outer peripheral surface of the lower end portion of the spool shaft 24a. A power transmitting gear, not shown, upwardly projected from the upper surface of the motor drive unit 38 through a cut, not shown, in the annular rotation center groove 26c of the lower end wall 26 engages with the gear 24b.

A side wall of the spool unit 24 facing a film loaded into the spool chamber of the spool unit 24 at an area between the paired end walls 26 is formed of, as set out above, an elastically deformable thin plate 28 whose area other than the portion 26a adjacent the lens barrel unit is greater than the portion 26a.

At a pair of mutually opposite inner end surfaces of the pair of end walls 26, annular cuts 26e are formed except at those portions adjacent the lens barrel unit 16 and have a diameter greater than the annular rotation center groove 26c.

The thin film 28 is made of a metal or synthetic resin of a light shielding property and has a curved section 28a having a diameter smaller than the annular cuts 26e of the paired inner end surfaces of the paired end walls 26 and a flat section 28b flattened along a section 26a adjacent the lens barrel unit 16.

The thin plate 28 has its upper and lower end edges pushed, against its own elasticity, between the paired end walls 26 from outside the radial direction of the annular cuts 26e in the paired opposite inner end surfaces, thus holding the paired annular cuts 26e with the upper and lower end edges of the thin plate from outside the radial direction and locating the flat section 28b along the portion 26e adjacent the lens barrel unit 16. As a result, the thin plate 28 constitutes other than the portion 26a adjacent the lens barrel unit 16 at the side wall of the spool unit 24.

The thin plate 28 is positioned between the paired end walls 26 simply by elastically holding the paired annular cuts 26e with its upper and lower end edges and it is easier to mount the thin plate 28 between the paired end walls.

Since the paired end walls 26 are connected together simply by the portion 26a adjacent the lens barrel unit 16, their portions far from the lens barrel unit 16 can be deformed toward or away from each other. Further, the thin plate 28 is also elastic in nature and can be mounted between the paired end walls 26 as mentioned above without heightening the dimensional accuracy of the paired end walls 26 and thin plate 28.

In the side wall situated between the paired end walls 26 of the spool unit 24, other than the portion 26a adjacent the lens barrel unit 16 is formed by the thin plate 28 and it is possible to reduce the external dimension of an area other than the portion 26a adjacent the lens barrel unit 16 at the side wall of the spool unit 24. In addition, it is also possible to reduce the external dimension of the front cover unit 10a and rear cover unit 10b in the outer mount housing.

The thin plate 28 includes the flat section 28b and it is possible to decrease the thickness of the portion 26a of the spool unit 24 and decrease the weight by cutting off some of the portion 26a. This promotes a decrease in weight of the spool unit 24 and positions the spool unit 24 nearer the adjacent lens barrel unit 16, so that it is possible to further decrease the outer dimension of the camera.

In the case where the thin film 28 is made of an elastic metal or an elastic conductive synthetic resin of a light shielding property, it can be connected to, for example, a grounding circuit of the above-mentioned flexible board unit 40 whereby static electricity generated due to a film, not shown, loaded into the spool chamber being frictionally contacted with the thin plate can be released from the thin plate 28. For this reason, the static electricity and dust are prevented from being deposited onto the thin plate 28 and hence the film is prevented from being scratched by the dust.

Figure 4:
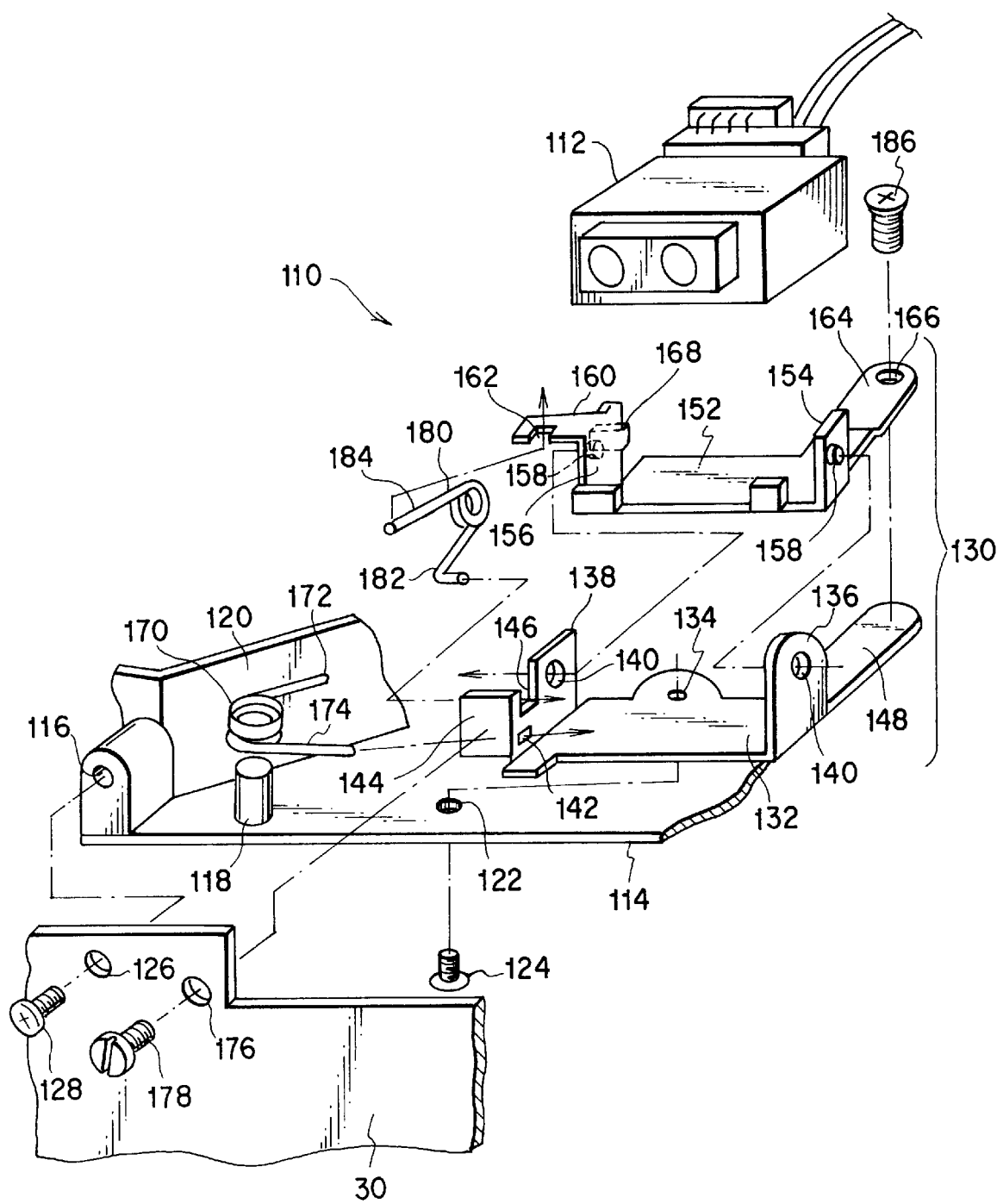
FIG. 4 is an exploded, perspective view showing a range finding device in an autofocus and finder control unit mounted on the camera according to the embodiment of the present embodiment.

The structure of the range finding device included in the autofocus and finder control unit 32 will be explained below with reference to FIG. 4.

The range finding device 110 includes a range finding module 112. The range finding module 112 is attached to a unit base 114 through an adjusting mechanism 130. The unit base 114 is fixed to the reinforcing plate unit 30 by engaging a screw 128 into a hole 116 formed on the unit base 114 through a hole 126 in the reinforcing plate unit 30. As a result, the autofocus and finder control unit 32 is supported as a whole.

The adjusting mechanism 130 includes a yaw support member 132 and pitch support member 152. The yaw support member 132 has a pin mount section 134 into which a pin 124 is inserted through a hole 122 in the base unit 114. As a result, the yaw support member 132 is mounted on the base unit 114 swingably in the right/left direction, that is, in a horizontal direction.

The yaw support member 132 has two opposite wall sections 136 and 138, which have holes 140 for mounting the pitch support member 152. The pitch support member 152 has two opposite vertical wall sections 154 and 156 having outwardly projecting pins 158. The pins 158 of the pitch support member 152 are fitted in the holes 140 of the yaw support member 132. As a result, the pitch support member 152 is mounted on the yaw support member 132 swingably in the up/down direction, that is, in a vertical direction.

The range finding module 112 is adhesively fixed to the pitch support member 152. As a result, through the adjusting mechanisms 130, the range finding module 112 is so supported as to be swingable about the pin 124 to the right or left and swingable about the pin 158 in an up/down fashion.

The unit base 114 has a spring receiving support column 118. A torsion coil spring 170 includes a turn section, which is fitted around the support column 118. The torsion coil spring 170 includes one end portion 172, which is abutted against a vertical wall surface 120 of the unit base 114, and the other end portion 174, which is inserted into the hole 142 in the vertical wall section 138 of the yaw support member 132. As a result, the yaw support member 132 is urged so that the vertical wall section 138 rotates about the pin 124 in a direction toward the reinforcing plate unit 30.

The screw hole 176 is provided in the reinforcing plate unit 30 and an adjusting screw 178 for right/left direction adjustment is threaded into the screw hole 176. The forward end of the adjusting screw 178 abuts against a screw receiving section 144 bent at an angle of 90° from the forward side of the vertical wall section 138 of the yaw support member 132 as an outwardly extending section. The threading inwardly of the adjusting screw 178 causes the yaw support member 132 to swing about the pin 124, against an elastic force of the torsion coil spring 170, in a direction in which the screw receiving section 144 is moved away from the reinforcing plate unit 30.

By rotationally operating the adjusting screw 178 back and forth, it is possible to adjust the direction of the yaw support member 132 relative to the right and left without clatter.

The pitch support member 152 has a spring receiving section 160 outwardly bent at angle of 90° from the upper side of the vertical wall section 156 as an outwardly extending section. The spring receiving section 160 has a cut 162, to which one end portion 184 of the torsion coil spring 180 is anchored. The turn section of a coil spring 180 is fitted around the spring turn section receiving section 168 bent at the angle of 90°. The other end section 182 of the coil spring 180 is 90° bent and anchored to a cut 146 in a vertical wall section 138 of the yaw support member 132. As a result, the pitch support member 152 is urged about the pin 158 in a direction in which the spring receiving section 160 is moved away from the yaw support member 132.

The pitch support member 152 has a rearwardly extending section 164, which faces an extending section 148 of the yaw support member 132. The end portion of the extending section 164 has a screw hole 166, into which an adjusting screw 186 for up-down direction adjustment is engaged. The forward end of the adjusting screw 186 abuts against the end portion of the extending portion 148 of the yaw support member 132. The screwing inwardly of the adjusting screw 186 swings the pitch support member 152 about the pin 154, against an elastic force of the torsion coil spring 180, in a direction in which the extending section 164 is moved away from the yaw support member 132.

By rotationally operating the adjusting screw 186 back and forth, it is possible to adjust the direction of the pitch support member 152 relative to the up and down without clatter The right/left direction adjustment of the yaw support member 132 is completely independent of the up/down direction adjustment of the pitch support member 152. That is, the right/left direction adjustment of the yaw support member 132 exerts no influence over the up/down direction of the pitch support member 152. On the other hand, the up/down direction adjustment of the pitch support member 152 exerts no influence over the right/left direction of the yaw support member 132.

Thus, by rotationally operating the adjusting screw 178, it is possible to adjust the direction of the range finding module relative to the right/left direction only. And, by rotationally operating the adjusting screw 186, it is possible to adjust the direction of the range finding module 112 relative to the up/down direction only.

Since the adjustment of the range finding module 112 relative to the right/left direction and that relative to the up/down direction are independent of each other and the respective adjustments are done by the rotational operation of the simple screw, the adjustment of the range finding module 112 can be made in a brief time with high accuracy. As a result, it is possible to achieve improved production of cameras.

Although, in the above-mentioned embodiment, the camera is exemplified in a way to correspond to a new cartridge film, the present invention is not limited to this application only. Needless to say, the present invention may also be applied even to a camera of, for example, a 35 mm film cartridge, as well as other types of cameras not referred to in the present specification.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A range finding device for a camera, comprising:
   a range finding module including a range finding element;
   a first support member supporting the range finding module as an integral unit and being swingable together with the range finding module about a first swing axis;

a second support member supporting the first support member through the first swing axis so that the first support member is swingable about the first swing axis, the second support member being swingable together with the range finding module and first support member about a second swing axis;

a first adjusting member including a part which abuts against the second support member, the first adjusting member being engaged with the first support member so that an operation of the first adjusting member swings the first support member about the first swing axis relatively to the second support member to adjust a position of a first optical axis of the range finding module; and a second adjusting member including a part which abuts against the second support member such that an operation of the second adjusting member swings the second support member about the second swing axis to adjust a position of a second optical axis of the range finding module.

2. A range finding device according to claim 1, wherein operation of one of the first and second adjustment members so as to adjust the position of one of the first and second optical axes of the range finding module, respectively, exerts no influence over the position of the other one of the first and second optical axes.

3. A range finding apparatus according to claim 1, wherein the first swing axis of the first support member and the second swing axis of the second support member are substantially orthogonal to each other.

4. A range finding apparatus according to claim 1, wherein the first and second adjusting members comprise screws whose forward end positions are changed by screwing thereof.

5. A range finding device for a camera, comprising:

a range finding module including a range finding element;

a first support member supporting the range finding module as an integral unit, the first support member having a first swing axis and being swingable about the first swing axis;

a second support member supporting the first support member through the first swing axis so that the first support member is swingable about the first swing axis, the second support member having a second swing axis and being swingable about the second swing axis together with the range finding module and the first support member;

a unit base swingably supporting the second support member about the second swing axis;

a first urging member that urges the first support member in a first direction about the first swing axis with respect to the second support member, the first urging member being positioned between the first and second support members;

a second urging member that urges the second support member in a second direction about the second swing axis with respect to the unit base, the second urging member being positioned between the second support member and the unit base;

a first adjusting member engaged with the first support member, the first adjusting member including an end portion which abuts against the second support member urged by the first urging member and which is moved by operating the first adjusting member, such that an operation of the first adjusting member swings the first support member against an urging force of the first urging member about the first swing axis relatively to the second support member to thereby adjust a position of a first optical axis of the range finding module; and a second adjusting member engaged with the base unit, the second adjusting member including an end portion which abuts against the second support member urged by the second urging member and which is moved by operating the second adjusting member, such that an operation of the second adjusting member swings the second support member against an urging force of the second urging member about the second swing axis to thereby adjust a position of a second optical axis of the range finding module.

6. A range finding device according to claim 5, wherein the operation of one of the first and second adjustment members so as to adjust the position of one of the first and second optical axes of the range finding module, respectively, exerts no influence over the position of the other one of the first and second optical axes.

7. A range finding device according to claim 5, wherein the first swing axis of the first support member and the second swing axis of the second support member are substantially orthogonal to each other.

8. A range finding device according to claim 5, wherein the first and second adjusting members comprise screws whose forward end positions are changed by screwing thereof, and the first adjusting member is screwed into the first support member and the second adjusting member is screwed into the base unit.

* * * * *